United States Patent
Sugiyama

(10) Patent No.: US 6,221,987 B1
(45) Date of Patent: Apr. 24, 2001

(54) METHOD FOR PRODUCING A FLUORINE-CONTAINING POLYMER

(75) Inventor: Norihide Sugiyama, Kanagawa (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/291,050

(22) Filed: Apr. 14, 1999

(30) Foreign Application Priority Data

Apr. 17, 1998 (JP) ................................. 10-108232

(51) Int. Cl.$^7$ ................................. C08F 4/34; C08F 16/24
(52) U.S. Cl. ................. 526/231; 526/230.5; 526/247; 526/254
(58) Field of Search ................. 526/231, 230.5, 526/247, 252, 254

(56) References Cited

U.S. PATENT DOCUMENTS

| | | | | |
|---|---|---|---|---|
| 4,282,334 | * | 8/1981 | Walter | 525/53 |
| 4,506,056 | * | 3/1985 | Gaylord | 524/445 |
| 4,598,123 | * | 7/1986 | Cutter | 525/84 |
| 4,897,457 | * | 1/1990 | Nakamura | 526/247 |
| 4,910,276 | * | 3/1990 | Nakamura | 526/247 |

FOREIGN PATENT DOCUMENTS 0 303 292   2/1989   (EP) .

* cited by examiner

Primary Examiner—Fred Zitomer
(74) Attorney, Agent, or Firm—Oblon, Spivak, McClelland, Maier & Neustadt, P.C.

(57) ABSTRACT

A method for producing a fluorine-containing polymer, which comprises subjecting the following fluorine-containing monomer (a), (b), (c) or (d) to bulk polymerization by means of a polymerization initiator comprising a fluorine-containing organic peroxide having a 10 hour half value temperature of from 30 to 130° C., to obtain a fluorine-containing polymer having a fluorine-containing alicyclic structure in its main chain:

(a) a fluorine-containing monomer having a fluorine-containing alicyclic structure, (b) a fluorine-containing monomer having at least two polymerizable double bonds, (c) the fluorine-containing monomer (a) and the fluorine-containing monomer (b), (d) at least one fluorine-containing monomer selected from the fluorine-containing monomers (a) and (b), and another fluorine-containing monomer other than the fluorine-containing monomers (a) and (b).

10 Claims, No Drawings

METHOD FOR PRODUCING A FLUORINE-CONTAINING POLYMER

The present invention relates to a method for producing a fluorine-containing polymer which is excellent in heat stability and chemical stability and has high transparency.

Heretofore, a non-fluorine type peroxide such as cyclohexyl peroxydicarbonate or diisopropyl peroxydicarbonate, has been used as a polymerization initiator in the production of a fluorine-containing polymer having a fluorine-containing alicyclic structure in its main chain. However, usually, a radical polymerization initiator does not 100% contribute to the polymerization reaction and may contribute only to a level of 20% to the polymerization reaction depending upon the type of the fluorine-containing monomer or the polymerization temperature.

Accordingly, the excess initiator is likely to decompose, and if this decomposition product has poor compatibility with the fluorine-containing polymer, turbidity will form as the polymerization proceeds. If a fluorine-containing polymer having such turbidity is used to produce various molded products such as lenses or transparent plates by high temperature melt molding such as heat deformation processing, compression molding or extrusion molding, there will be a problem such that the molded products tend to be turbid, or bubbling or coloring is likely to result whereby the desired molded product can hardly be obtainable.

Further, also in a case where a molded product is directly produced by bulk polymerization at a relatively low temperature, turbidity is likely to result, and the appearance or the functionality of the molded product tends to be poor. In a case where a fluorine-containing polymer is produced at a high temperature in order to reduce the remaining ratio of an unreacted fluorine-containing monomer or to increase the productivity, if a high temperature decomposable non-fluorine type peroxide such as di-t-butyl peroxide or t-butyl peroxybenzoate is used as a polymerization initiator, there has been a problem of coloring during the polymerization.

On the other hand, a perfluoro(diacyl peroxide) such as $[C_3F_7C(O)O]_2$ or $[C_2F_5C(O)O]_2$ may sometimes be used as a polymerization initiator for a fluorine-containing monomer. However, such an initiator has a 10 hour half value temperature of lower than 30° C. and a low decomposition temperature and thus has a danger of possible explosion, and it is accordingly used as diluted with a solvent. Accordingly, it is likely that the solvent will remain in the produced polymer, which is likely to deteriorate the physical properties.

Further, such a polymerization initiator has a high decomposition rate, and when the polymerization speed of a fluorine-containing monomer is relatively slow, the initiator is likely to be consumed before the reaction adequately proceeds, and it may be required to add the initiator during the polymerization. Therefore, the initiator is required in an amount larger than usual, which tends to lead to the above-mentioned bubbling or coloring during the production of a molded product. Further, it is not practical to use a large amount of the initiator all at once in bulk polymerization wherein it is difficult to remove the heat generated by the reaction, since the reaction rate can not be controlled, and direct production of the molded product tends to be difficult.

It is an object of the present invention to solve the above-mentioned problems in the prior art and to provide a method for producing a fluorine-containing polymer which is excellent in the heat stability and chemical stability and has high transparency.

The present invention provides a method for producing a fluorine-containing polymer, which comprises subjecting the following fluorine-containing monomer (a), (b), (c) or (d) to bulk polymerization by means of a polymerization initiator comprising a fluorine-containing organic peroxide having a 10 hour half value temperature of from 30 to 130° C., to obtain a fluorine-containing polymer having a fluorine-containing alicyclic structure in its main chain:

(a) a fluorine-containing monomer having a fluorine-containing alicyclic structure, (b) a fluorine-containing monomer having at least two polymerizable double bonds, (c) the fluorine-containing monomer (a) and the fluorine-containing monomer (b), (d) at least one fluorine-containing monomer selected from the fluorine-containing monomers (a) and (b), and another fluorine-containing monomer other than the fluorine-containing monomers (a) and (b).

Now, the present invention will be described in detail with reference to the preferred embodiments.

Not only the fluorine-containing organic peroxide to be used in the present invention itself but also its decomposition product which did not contribute to the polymerization initiation reaction, has good solubility in "the fluorine-containing polymer having a fluorine-containing alicyclic structure in its main chain" (hereinafter referred to simply as the fluorine-containing polymer), and accordingly, the fluorine-containing polymer obtained by bulk polymerization is transparent without turbidity Further, in a case where an initiator of the type decomposable at a relatively high temperature is used, the conversion of the fluorine-containing monomer increases, and the fluorine-containing monomer remaining in the fluorine-containing polymer will be very little. Accordingly, a molded product formed by heating or melt molding of the fluorine-containing polymer by e.g. heat modification processing, compression molding, extrusion molding or injection molding (hereinafter referred to simply as the fluorine-containing molded product) tends to hardly undergo modification such as coloring or turbidifying with time by the decomposition of the fluorine-containing monomer.

The term "having a fluorine-containing alicyclic structure in its main chain" is meant for having a structure wherein at least one carbon atom constituting the alicyclic ring is a carbon atom in the carbon chain constituting the main chain, and a fluorine atom or a fluorine-containing group is bonded to at least a part of carbon atoms constituting the alicyclic ring.

The polymerization initiator to be used in the present invention is a fluorine-containing organic peroxide having a 10 hour half value temperature of from 30 to 130° C. The 10 hour half value temperature is a temperature at which the polymerization initiator undergoes thermal decomposition, and the weight of the polymerization initiator becomes a half in 10 hours. A preferred 10 hour half value temperature is from 40 to 100° C. If the 10 hour half temperature is too low, a danger of explosion is likely, such being undesirable, and if the 10 hour half temperature is too high, the reaction temperature tends to be high, whereby the starting material monomer is likely to be evaporated, such being undesirable.

The fluorine-containing organic peroxide is preferably at least one member selected from the group consisting of a fluorine-containing diacyl peroxide, a fluorine-containing peroxydicarbonate, a fluorine-containing peroxyester, a fluorine-containing dialkyl peroxide, and a fluorine-containing diaryl peroxide. A more preferred fluorine-containing organic peroxide is a fluorine-containing dialkyl peroxide.

In the backbone structure of the organic peroxide in the present invention, the alkyl group may be linear or branched, or may be an aralkyl group i.e. an alkyl group substituted by an aryl group.

The fluorine-containing organic peroxide is preferably a perfluoro compound from the viewpoint of the compatibility and the thermal stability. However, some of fluorine atoms in the molecule may be substituted by hydrogen atoms, chlorine atoms or bromine atoms.

Usually, if fluorine atoms are bonded to the carbon atom at the α-position adjacent to a peroxy bond-containing structural portion such as —C(O)OO— or —C(O)OOC(O)—, cleavage of the —OO— bond is likely to take place due to the electron attracting nature, and the initiator will be a low temperature decomposable polymerization initiator. Accordingly, in the present invention, it is preferred that fluorine atoms are not directly bonded to the carbon atom at the α-position, and $(Rf)_3C$—, $(Rf)_2CH$—, $RfCH_2$—, a polyfluorophenyl group or the like is directly bonded to the carbon atom at the α-position. Here, Rf represents a $C_{1-10}$ polyfluoroalkyl group.

The proportion of the fluorine-containing organic peroxide to the fluorine-containing monomer is preferably from 0.01 to 5 parts by weight, more preferably from 0.1 to 1 part by weight, of the fluorine-containing organic peroxide, to 100 parts by weight of the fluorine-containing monomer. If the proportion of the fluorine-containing organic peroxide is small, the residual amount of the unreacted fluorine-containing monomer will be large, which is likely to cause deterioration in the physical properties of the fluorine-containing molded product, or deterioration such that the fluorine-containing molded product will be colored due to decomposition of the fluorine-containing monomer during the use at a high temperature. On the other hand, if it is too much, the proportion of the fluorine-containing organic peroxide which did not contribute to the polymerization, tends to be large, and such a fluorine-containing organic peroxide will be decomposed, whereby the fluorine-containing polymer tends to be turbidified or colored, such being undesirable.

The fluorine-containing diacyl peroxide may, for example, be $[C_6F_5C(O)O]_2$, $[C_6F_5C(CH_3)_2C(O)O]_2$, $[CF_3OCF_2CF_2C(O)O]_2$, $[CF_3CH_2C(O)O]_2$, $[(CF_3)_2CHC(O)O]_2$ or $[(CF_3)_3CC(O)O]_2$. Here, $C_6F_5$ represents a perfluorophenyl group. The same applies hereinafter.

The fluorine-containing peroxydicarbonate may, for example, be $[(CF_3)_2CHOC(O)O)]_2$, $[CF_3(CF_2)_nCH_2OC(O)O]_2$ (n=1 to 3), $[C_6F_5OC(O)O]_2$ or $[C_6F_5CH_2OC(O)O]_2$.

The fluorine-containing peroxyester may, for example, be $CF_3CF_2CH_2OOC(O)C(CF_3)_3$, $(CF_3)_2CHOOC(O)C(CF_3)_3$, $(CF_3)_2CHOOC(O)CH_2CF_2CF_3$, $CF_3CF_2CHOOC(O)CH_2CF_2CF_3$, $CF_3CF_2CHOOC(O)C_6F_5$ or $(CF_3)_2CHOOC(O)C_6F_5$.

The fluorine-containing dialkyl peroxide may, for example, be $[CF_3C_6F_4C(CF_3)_2O]_2$, $[(CF_3)_3CO]_2$ or $C_6F_5C(CF_3)_2OOC(CF_3)_3$. Here, $C_6F_4$ represents a 1,4-perfluorophenylene group.

The fluorine-containing diaryl peroxide may, for example, be $[C_6F_5O]_2$.

The reaction temperature for the bulk polymerization employing such a fluorine-containing organic peroxide, is preferably from 30 to 150° C., more preferably from 40 to 100° C.

The fluorine-containing polymer obtained by bulk polymerization by means of such a fluorine-containing organic peroxide, may be treated with fluorine gas to increase the thermal stability. For example, by exposing it to fluorine gas at a temperature of not higher than the glass transition temperature or the softening temperature of the fluorine-containing polymer, it is possible to prevent turbidifying or coloring. The function of fluorine gas is not clearly understood, but it is believed that fluorine gas is added to the double bonds of an unreacted monomer so that the monomer is converted to a saturated stable compound. Further, it may be effective to remove a volatile substance by subjecting the fluorine-containing polymer to vacuum drying under heating, as the case requires.

As the fluorine-containing polymer, a fluorine-containing polymer is preferred which has a fluorine content of from 40 to 75 wt % and a number average molecular weight of from 10,000 to 1,000,000. The fluorine content is more preferably from 50 to 70 wt %, and the number average molecular weight is more preferably from 20,000 to 500,000.

The fluorine-containing polymer may, for example, be a fluorine-containing polymer having a fluorine-containing alicyclic structure in its main chain, which is a polymer obtainable by polymerizing a fluorine-containing monomer having a fluorine-containing alicyclic structure, or a polymer obtainable by cyclic polymerization of a fluorine-containing monomer having at least two polymerizable double bonds.

The fluorine-containing polymer in the present invention is one obtained by subjecting the following fluorine-containing monomer (a), (b), (c) or (d) to bulk polymerization by means of a polymerization initiator comprising a fluorine-containing organic peroxide having a 10 hour half value temperature of from 30 to 130° C.:

(a) a fluorine-containing monomer having a fluorine-containing alicyclic structure, (b) a fluorine-containing monomer having at least two polymerizable double bonds, (c) the fluorine-containing monomer (a) and the fluorine-containing monomer (b), (d) at least one fluorine-containing monomer selected from the fluorine-containing monomers (a) and (b), and another fluorine-containing monomer other than the fluorine-containing monomers (a) and (b).

The fluorine-containing monomer (a) may, for example, be perfluoro(2,2-dimethyl-1,3-dioxole).

The fluorine-containing monomer (b) may, for example, be a cyclopolymerizable fluorine-containing monomer such as perfluoro(allyl vinyl ether) or perfluoro(butenyl vinyl ether).

Said another fluorine-containing monomer other than the fluorine-containing monomers (a) and (b), may, for example, be a fluorine-containing monomer which has no fluorine-containing cyclic structure and which is not cyclopolymerizable, such as tetrafluoroethylene, chlorotrifluoroethylene or perfluoro(methyl vinyl ether).

Preferred fluorine-containing monomers (or a combination of fluorine-containing monomers) are fluorine-containing monomers (a), (b) and (c).

The fluorine-containing polymer obtainable by polymerizing the fluorine-containing monomer (a), and a fluorine-containing polymer obtainable by polymerizing the fluorine-containing monomer (a) with another fluorine-containing monomer other than the fluorine-containing monomers (a) and (b), are known by e.g. JP-B-63-18964.

Further, the fluorine-containing polymer obtainable by cyclo-polymerizing the fluorine-containing monomer (b) and the fluorine-containing polymer obtainable by polymerizing the fluorine-containing monomer (b) with another fluorine-containing monomer other than the fluorine-containing monomers (a) and (b), are known by e.g. JP-A-63-238111 or JP-A-63-238115.

Further, a fluorine-containing polymer can be obtained also by copolymerizing the fluorine-containing monomer (a) such as perfluoro(2,2-dimethyl-1,3-dioxole) with the fluorine-containing monomer (b) such as perfluoro(allyl vinyl ether) or perfluoro(butenyl vinyl ether).

The fluorine-containing polymer is preferably one containing at least 20 mol %, preferably at least 40 mol %, of polymer units having a fluorine-containing alicyclic structure in its main chain, based on the total polymer units of the fluorine-containing polymer, from the viewpoint of transparency or mechanical properties.

Specifically, one having repeating units selected from the following formulae (1) to (5), may be mentioned as such a fluorine-containing polymer. Fluorine atoms in such a fluorine-containing polymer may partly be substituted by chlorine atoms.

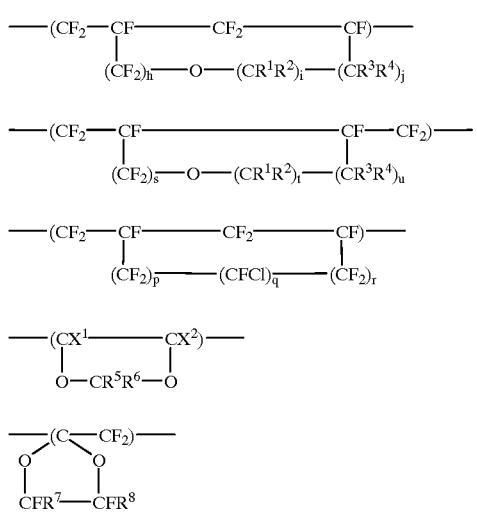

In the formulae (1) to (5), h is an integer of from 0 to 5, i is an integer of from 0 to 4, j is 0 or 1, h+i+j is an integer of from 1 to 6, s is an integer of from 0 to 5, t is an integer of from 0 to 4, u is 0 or 1, s+t+u is an integer of from 1 to 6, each of p, q and r which are independent of one another, is an integer of from 0 to 5, p+q+r is an integer of from 1 to 6, each of $R^1$, $R^2$, $R^3$, $R^4$, $X^1$ and $X^2$ which are independent of one another, is H, D (deuterium), F, Cl or $CF_3$, each of $R^5$, $R^6$, $R^7$ and $R^8$ which are independent of one another, is H, D (deuterium), F, Cl, $C_nF_{2n+1}$, $C_nF_{2n+1-m}Cl_mO_k$, or $C_nF_{2n+1-m}H_mO_k$, wherein n is an integer of from 1 to 5, m is an integer of from 0 to 5, and k is an integer of from 0 to 2, provided that $R^7$ and $R^8$ may be connected to form a ring.

In the present invention, the fluorine-containing monomer having a fluorine-containing cyclic structure is preferably a monomer selected from compounds of the following formulae (6) to (8):

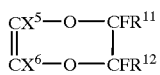
(6)

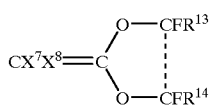
(6)

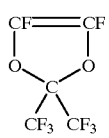
(7)

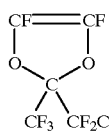
(8)

In the formulae (6) to (8), each of $X^3$ to $X^8$ which are independent of one another, is H, D (deuterium), F, Cl or $CF_3$, each of $R^9$ to $R^{14}$ which are independent of one another, is H, D (deuterium), F, Cl, $C_nF_{2n+1}$, $C_nF_{2n+1-m}Cl_mO_k$, or $C_nF_{2n+1-m}H_mO_k$, wherein n is an integer of from 1 to 5, m is an integer of from 0 to 5, and k is an integer of from 0 to 2, provided that $R^9$ and $R^{10}$, $R^{11}$ and $R^{12}$, or $R^{13}$ and $R^{14}$, may be connected to form a ring.

As specific examples of the compounds of the formulae (6) to (8), compounds of the formulae (9) to (16) may, for example, be mentioned.

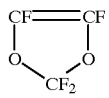
(9)

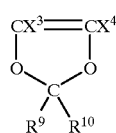
(10)

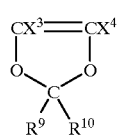
(11)

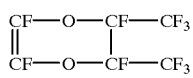
(12)

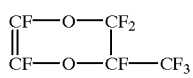
(13)

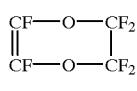
(14)

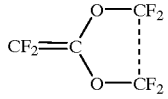
(15)

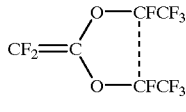
(16)

As the fluorine-containing monomer having at least two polymerizable double bonds, compounds of the following formulae (17) to (19) are preferred.

(17)

$$CZ^1Z^2=CZ^3OCZ^4Z^5CZ^6=CZ^7Z^8 \quad (18)$$

$$CW^1W^2=CW^3OCW^4W^5OCW^6=CW^7W^8 \quad (19)$$

In the formulae (17) to (19), each of $Y^1$ to $Y^{10}$, $Z^1$ to $Z^8$ and $W^1$ to $W^8$ which are independent of one another, is H, D (deuterium), F, Cl or $CF_3$.

As specific examples of the compounds of the formulae (17) to (19), the following compounds may be mentioned:

$CF_2=CFOCF_2CF_2\ CF=CF_2$,
$CF_2=CFOCCl_2CF_2CF=CF_2$,
$CF_2=CFOCF_2CF_2CCl=CF_2$,
$CF_2=CFOCF_2CF_2CF=CF_2$,
$CF_2=CFOCF_2CFCl\ CF=CF_2$,
$CF_2=CFOCF_2CF_2CF=CFCl$,
$CF_2=CFOCF_2CF(CF_3)CF=CF_2$,
$CF_2=CFOCF_2CF(CF_3)CCl=CF_2$,
$CF_2=CFOCF_2CF=CF_2$,
$CF_2=CFOCF(CF_3)CF=CF_2$,
$CF_2=CFOCF_2OCF=CF_2$,
$CF_2=CClOCF_2OCCl=CF_2$,
$CF_2=CFOCCl_2OCF=CF_2$,
$CF_2=CFOC(CF_3)_2OCF=CF_2$.

Depending upon the shape of the reactor for the bulk polymerization in the present invention, the fluorine-containing polymer obtained by the bulk polymerization can be formed directly into an article of a various shape such as a sheet, tubular or rod shape. Otherwise, the fluorine-containing polymer obtained by the bulk polymerization can be formed into an article having a various shape such as a sheet, tubular or rod shape by melt forming such as heat deformation processing, compression molding, extrusion molding or injection molding.

The fluorine-containing polymer obtainable by the method of the present invention has high transparency, and the light scattering loss of the fluorine-containing polymer can be made to a level of at most 100 dB/km, preferably at most 50 dB/km or most preferably at most 30 dB/km.

The highly transparent fluorine-containing polymer obtained by the method of the present invention, is useful as an optical resin material and can be used, for example, for optical fibers or their preform, for optical waveguides, for optical lenses or as a substrate material for media such as compact discs. Further, it is excellent in chemical resistance, whereby it is useful as a window material to be used for e.g. a chemical plant. Further, it has a high ultraviolet ray transmittance, whereby it is useful for e.g. a tube for an ultraviolet ray lamp.

If soluble in the fluorine-containing monomer, a dye, a high refractive index compound, a dopant such as a conductive compound or various types of organic metal complexes may be incorporated during the bulk polymerization and may uniformly be dispersed in the fluorine-containing polymer. Accordingly, such a polymer may be useful as a matrix material for various optoelectronic devices.

Now, the present invention will be described in further detail with reference to Examples. However, it should be understood that the present invention is by no means restricted to such specific Examples.

In the following Examples, the following abbreviation will be used. Further, Examples 1 to 3, 7 and 8 represent Examples of the present invention, and Examples 4 to 6 represent Comparative Examples.

PBTHF: Perfluoro(2-butyltetrahydrofuran),
PBVE: Perfluoro(butenyl vinyl ether),
PDD: Perfluoro(2,2-dimethyl-1,3-dioxole),
PFBPO: Perfluorobenzoyl peroxide,
R225: Dichloropentafluoropropane.

EXAMPLE 1

Into a glass tube having an outer diameter of 1.6 mm and an inner diameter of 1.2 mm, 10 g of PBVE, 0.1 g of PFBPO (10 hour half value temperature: 68° C.), and 0.04 g of chloroform were charged, and freeze deaeration was repeated three times by means of liquid nitrogen. Then, the glass tube was sealed. This glass tube was maintained in an oven of 50° C. for 2 days, whereby the content was completely solidified. The glass tube was maintained further at 70° C. for 1 day, and then the glass tube was broken to take out a polymer, whereby a colorless transparent tough rod-shaped solid was obtained. This rod-shaped solid was dried in vacuum at 90° C. for 1 day.

The intrinsic viscosity of the rod-shaped solid (hereinafter referred to as rod A) after vacuum drying was 0.36 dl/g at 30° C. in PBTHF. Further, rod A was heated at 200° C. for 1 hour, whereby no formation of bubbles was observed, and it remained to be colorless transparent. The weights before and after the heating were measured, whereby the weight reduction was observed to be 0.8%. This indicates that the conversion of PBVE was as high as at least 99%.

Further, using a laser beam having a wavelength of 633 nm, the light scattering intensities of rod A with respect to the horizontal deflection component and the vertical deflection component within a range of a scattering angle of from 20° to 120°, were obtained, and the total scattering loss was calculated and found to be 19 dB/km. This indicates that rod A is excellent in transparency and is suitable as an optical resin material for e.g. optical fibers.

Rod A was set in a mold and subjected to compression molding at 180° C. under a load of 50 kg to obtain a plastic lens. No formation of bubbles was observed in this lens, an& no coloring was observed.

EXAMPLE 2

Into a glass tube having an outer diameter of 1.6 mm and an inner diameter of 1.2 mm, 10 g of PBVE, 0.1 g of $[CF_3(CF_2)_2CH_2OC(O)O]_2$ (10 hour half value temperature: 70° C.) and 0.04 g of chloroform were charged, and freeze deaeration was repeated three times by means of liquid nitrogen. Then, the test tube was sealed. This test tube was maintained in an oven of 50° C. for 2 days, whereby the content was completely solidified. The test tube was further maintained at 70° C. for 1 day, and then the glass tube was broken to take out a polymer, whereby a colorless transparent tough rod-shaped solid was obtained. This rod-shaped solid was dried in vacuum at 90° C. for 1 day.

The intrinsic viscosity of this rod-shaped solid (hereinafter referred to as rod B) after the vacuum drying was 0.39 dl/g at 30° C. in PBTHF. Further, rod B was heated at 200° C. for 1 hour, whereby no formation of bubbles was observed, and the rod remained to be colorless transparent. The weights before and after the heating were measured, whereby the weight reduction was observed to be 0.8%. This indicates that the conversion of PBVE was as high as at least 99%.

Further, the light scattering intensities of rod B were measured by means of a laser beam having a wavelength of 633 nm, and the total scattering loss was calculated in the same manner as in Example 1 and found to be 16 dB/km. This indicates that rod B is excellent in transparency and is suitable as an optical resin material for e.g. optical fibers.

Rod B was set in a mold and subjected to compression molding at 180° C. under a load of 50 kg to obtain a plastic lens. No formation of bubbles was observed in this lens, and no coloring was observed.

EXAMPLE 3

Into a glass tube having an outer diameter of 1.6 mm and an inner diameter of 1.2 mm, 10 g of PBVE, 0.1 g of $[(CF_3)_2CHOC(O)O]_2$ (10 hour half value temperature: 65° C.) and 0.04 g of chloroform were charged, and freeze deaeration was repeated three times by means of liquid nitrogen. Then, the glass tube was sealed. This glass tube was maintained in an oven of 50° C. for 2 days, whereby the content was completely solidified. Further, the glass tube was maintained at 70° C. for 1 day, and then the glass tube was broken to take out a polymer. The polymer was a colorless transparent tough rod-shaped solid . This rod-shaped solid was vacuum-dried at 90° C. for 1 day.

The specific viscosity of the rod-shaped solid (hereinafter referred to as rod C) after the vacuum drying was 0.32 dl/g at 30° C. in PBTHF. Further, rod C was heated at 200° C. for 1 hour, whereby no formation of bubbles was observed, and the rod remained to be colorless transparent. The weights before and after the heating were measured, whereby the weight reduction was observed to be 0.8%. This indicates that the conversion of PBVE was as high as at least 99%.

Further, the light scattering intensities of rod C were measured by means of a laser beam having a wavelength of 633 rim, and the total scattering loss was calculated by the same method as in Example 1 and found to be 30 dB/km. This indicates that rod C is excellent in transparency and suitable as an optical resin material for e.g. optical fibers.

Rod C was set in a mold and subjected to compression molding at 180° C. under a load of 50 kg to obtain a plastic lens. No formation of bubbles was observed in this lens, and coloring was not observed.

EXAMPLE 4

Into a glass tube having an outer diameter of 1.6 mm and an inner diameter of 1.2 mm, 10 g of PBVE, 0.1 g of diisopropyl peroxydicarbonate (IPP) (10 hour half value temperature: 42° C.) and 0.02 g of chloroform were charged, and freeze deaeration was repeated three times by means of liquid nitrogen. Then, the glass tube was sealed. This glass tube was maintained in an oven of 50° C. for 2 days, whereby the content was solidified. The polymer rod thereby obtained was slightly turbid. Further, it was maintained at 70° C. for 1 day. Then, the glass tube was broken to take out a polymer, and then the polymer was dried in vacuum at 90° C. for 1 day.

The intrinsic viscosity of the rod-shaped solid (hereinafter referred to as rod D) after the vacuum drying was 0.18 dl/g at 30° C. in PBTHF. Further, rod D was heated at 200° C. for 1 hour, whereby vigorous formation of bubbles was observed, and the rod underwent yellowing. Further, the weight change before and after the heating was 4%, which indicates that the conversion was inadequate.

EXAMPLE 5

Into a glass tube having an outer diameter of 1.6 mm and an inner diameter of 1.2 mm, 10 g of PBVE, 0.1 g of t-butylbenzyloxy benzoate (10 hour half value temperature: 104° C.), and 0.04 g of chloroform were charged, and freeze deaeration was repeated three times by means of liquid nitrogen. Then, the glass tube was sealed. This glass tube was maintained in an oven of 90° C. for 2 days, whereby in the reaction liquid, black fine particulate precipitates were formed, and no solidification took place although the viscosity slightly increased.

EXAMPLE 6

Into a glass tube having an outer diameter of 1.6 mm and an inner diameter of 1.2 mm, 10 g of PVBE, 1 g of a R225 solution containing 5 wt % of $[CF_3CF_2CF_2C(O)O]_2$ (10 hour half value temperature: 21° C.) and 0.04 g of chloroform were charged, and freeze deaeration was repeated three times by means of liquid nitrogen. Then, the glass tube was sealed. This glass tube was maintained in an oven of 50° C. for 2 days, whereby no solidification took place, although the viscosity of the reaction liquid slightly increased.

EXAMPLE 7

Into a glass tube having an outer diameter of 1.6 mm and an inner diameter of 1.2 mm, 6 g of PVBE, 4 g of PDD, 0.5 g of $[CF_3OCF_2CF_2C(O)O]_2$ (10 hour half value temperature: 36° C.) and 0.04 g of chloroform were charged, and freeze deaeration was repeated three times by means of liquid nitrogen. Then, the glass tube was sealed. This glass tube was maintained in an oven of 30° C. for 2 days, whereby the content was completely solidified. Further, it was maintained at 50° C. for 1 day. Then, the glass tube was broken to take out a polymer, whereby the polymer was a colorless transparent tough rod-shaped solid. This solid was dried in vacuum at 120° C. for 1 day.

The intrinsic viscosity of the rod-shaped solid (hereinafter referred to rod E) after the vacuum drying was 0.48 dl/g at 30° C. in PBTHF. Rod E was heated at 200° C. for 1 hour, whereby no formation of bubbles was observed, and the rod remained to be colorless transparent. The weights before and after the heating were measured, and the weight reduction was observed to be 0.9%. This indicates that the conversion of the monomer was as high as at least 99%.

Further, the light scattering intensities of rod E were measured by means of a laser beam with a wavelength of 633 nm, and the total scattering loss was calculated in the same manner as in Example 1 and found to be 35 dB/km. This indicates that rod E is excellent in transparency and suitable as an optical resin material for e.g. optical fibers.

Rod E was set in a mold and subjected to compression molding at 200° C. under a load of 50 kg to obtain a plastic lens. In this lens, no formation of bubbles was observed, and no coloring was observed.

EXAMPLE 8

Into a glass tube having an outer diameter of 1.6 mm and an inner diameter of 1.2 mm, 12 g of PVBE, 8 g of PDD, 0.2 g of $[CF_3OCF_2CF_2C(O)O]_2$ (10 hour half value temperature: 36° C.) and 0.12 g of chloroform were charged, and freeze deaeration was repeated three times by means of liquid nitrogen. Then, the glass tube was sealed. This glass tube was maintained at 30° C. for 2 days while being rotated for polymerization and solidification to obtain a hollow tube having a length of about 20 cm.

Then, into this hollow tube, 45 g of PBVE, 0.45 g of PFBPO and 0.18 g of chloroform were charged and maintained at 50° C. for 2 days and then at 70° C. for 1 day for polymerization and solidification. Then, the solid was subjected to vacuum drying at 90° C. for 1 day to obtain a core-clad type optical fiber preform. This preform was heat melted from the forward end by a heating furnace of 250° C.

to spin an optical fiber having a diameter of 0.6 mm. The optical transmission loss of this optical fiber was measured by a cut back method and found to be 180 dB/km at a wavelength of 780 nm, 130 dB/km at 850 nm and 90 dB/km at 1,300 nm, and thus this optical fiber was confirmed to be an optical fiber which is capable of transmitting lights ranging from visible lights to near infrared lights well.

According to the method of the present invention, it is possible to obtain a highly transparent fluorine-containing polymer which is excellent in the thermal stability and chemical stability and which is free from problems such as turbidity, bubbles or coloring. From this fluorine-containing polymer, it is possible to obtain a highly transparent melt-molded product which is excellent in the thermal stability and chemical stability and which is free from problems such as turbidity, bubbles or coloring. The reason for being free from turbidity or coloring is believed to be such that the compatibility of the polymerization initiator to the fluorine-containing monomer and the polymer is good, and the conversion of the fluorine-containing monomer is high.

What is claimed is:

1. A method for producing a fluorine-containing polymer, which comprises subjecting the following fluorine-containing monomer (a), (b), (c) or (d) to bulk polymerization by means of a polymerization initiator comprising a fluorine-containing organic peroxide having a 10 hour half value temperature of from 30 to 130° C., to obtain a fluorine-containing polymer having a fluorine-containing alicyclic structure in its main chain:

(a) a fluorine-containing monomer having a fluorine-containing alicyclic structure, (b) a fluorine-containing monomer having at least two polymerizable double bonds, (c) the fluorine-containing monomer (a) and the fluorine-containing monomer (b), (d) at least one fluorine-containing monomer selected from the fluorine-containing monomers (a) and (b), and another fluorine-containing monomer other than the fluorine-containing monomers (a) and (b).

2. The method according to claim 1, wherein the fluorine-containing organic peroxide is at least one member selected from the group consisting of a fluorine-containing diacyl peroxide, a fluorine-containing peroxydicarbonate, a fluorine-containing peroxyester, a fluorine-containing dialkyl peroxide, and a fluorine-containing diaryl peroxide.

3. The method according to claim 1, wherein the proportion of the fluorine-containing organic peroxide to the fluorine-containing monomer is from 0.01 to 5 parts by weight of the fluorine-containing organic peroxide to 100 parts by weight of the fluorine-containing monomer.

4. The method according to claim 1, wherein the fluorine-containing polymer contains at least 20 mol % of polymer units having a fluorine-containing alicyclic structure, based on the total polymer units of the fluorine-containing polymer.

5. The method according to claim 1, wherein the fluorine-containing polymer has a fluorine content of from 40 to 75 wt %.

6. The method according to claim 1, wherein the fluorine-containing polymer has a number average molecular weight of from 10,000 to 1,000,000.

7. The method according to claim 1, wherein the fluorine-containing monomer (a) is perfluoro(2,2-dimethyl-1,3-dioxole).

8. The method according to claim 1, wherein the fluorine-containing monomer (b) is perfluoro(butenyl vinyl ether).

9. The method according to claim 1, wherein said another fluorine-containing monomer other than the fluorine-containing monomers (a) and (b) is a radical polymerizable fluorine-containing monomer which has no fluorine-containing cyclic structure and is not cyclopolymerizable.

10. The method according to claim 1, wherein the light scattering loss of the fluorine-containing polymer is at most 100 dB/km.

* * * * *